United States Patent [19]
Albera et al.

[11] Patent Number: 5,266,143
[45] Date of Patent: Nov. 30, 1993

[54] SOUNDPROOFING PANELS FOR AUTOMOBILE APPLICATIONS AND MANUFACTURING PROCESSES THEREFOR

[75] Inventors: Sergio Albera, Turin; Guglielmo Piumetti, Carignano, both of Italy

[73] Assignee: C.S.P. Centro Studi e Prototipi S.r.l., Trofarello, Italy

[21] Appl. No.: 514,709

[22] Filed: Apr. 26, 1990

Related U.S. Application Data

[63] Continuation-in-part of Ser. No. 153,806, Feb. 8, 1988, abandoned.

[30] Foreign Application Priority Data

Feb. 10, 1987 [IT] Italy ............... 67082 A/87

[51] Int. Cl.⁵ .............. B29C 47/00; B29C 67/00; E04B 1/82
[52] U.S. Cl. .................... 156/245; 156/197; 156/214; 156/322; 156/307.1; 156/307.7; 156/307.3; 264/46.4; 264/46.8; 181/284; 181/294
[58] Field of Search .............. 156/242, 243, 245, 322, 156/197, 214, 307.1, 307.3, 307.7; 264/46.4, 46.8; 181/284, 294

[56] References Cited

U.S. PATENT DOCUMENTS 5,034,076  7/1991  Masui et al. .................. 156/245

*Primary Examiner*—James J. Bell
*Attorney, Agent, or Firm*—Bachman & LaPointe

[57] ABSTRACT

Composite soundproofing panels for applications in the automotive sector have a plastic layer bonded to at least one porous material layer. The plastic layer has a composition which contains a first elastomeric material, a high density filler material, a plasticizer and a second elastomeric material. The plastic layer is bonded to at least one self-supporting, premoldable layer of porous material while maintaining a constant thickness within +10%.

5 Claims, 3 Drawing Sheets

SOUNDPROOFING PANELS FOR AUTOMOBILE APPLICATIONS AND MANUFACTURING PROCESSES THEREFOR

CROSS-REFERENCE TO RELATED APPLICATION(S)

The present application is a continuation-in-part of now abandoned U.S. patent application Ser. No. 153,806, filed Feb. 8, 1988 for SOUNDPROOFING PANELS FOR APPLICATIONS IN THE AUTOMOTIVE SECTOR AND THEIR MANUFACTURING PROCEDURE By Albera et al.

BACKGROUND OF THE INVENTION

The present invention refers to soundproofing panels having a high acoustic efficiency to be used in the automotive sector and to their manufacturing procedure.

A wide variety of materials are used to form sound absorbing/insulating structures for use in automobiles. The following patent documents illustrate some of these materials.

U.K. Published Patent Application 2,056,360A to Teroson, GmbH describes a sound insulating/absorbing part having a foam layer formed by placing a plastic material into a mould cavity into localized areas of which have been inserted sheet blanks. The sheets blanks may be formed by a plastic containing a high charge of heavy inorganic fillers, mixtures of polyolefins or EPDM polymers. The foam embeds the blanks which define regions having different sound absorbing/insulating properties.

U.S. Pat. Nos. 4,242,395 and 4,335,034 to Zuckerman et al. describe a thermoplastic composition suitable for use as an automobile carpet backing. The composition contains a high filler content, greater than 60% by weight, 5-25% by weight of an ethylene homopolymer or copolymer, 1-10% by weight of a non-vulcanized elastomeric resin and 1-15% by weight of a plasticizer.

U.S. Pat. No. 4,438,228 to Schenck also illustrates a filled thermoplastic composition useful as sound insulation for an automobile carpet. The compositions are obtained by blending about 5-55% by weight of ethylene α-olefin copolymer, the α-olefin containing from 4 to 10 carbon atoms; about 2-12% by weight of plasticizer selected from the group consisting of processing oils, epoxidized oils, polyethers, polyesters and polyether esters; about 40-90% by weight of filler; and optionally elastomeric polymers.

U.K. Published Patent Application 2,072,578A to Toa Nenryo Kogyo KK relates to a carpet having bonded to its rear surface a composition comprising a polyolefin, synthetic rubber, petroleum oil and an organic filler.

SUMMARY OF THE INVENTION

In accordance with the present invention, improved soundproofing panels having equal sound absorption/insulation properties at reduced weight are provided. These soundproofing panels are of a laminate construction with a first substrate layer formed from a heavy, thermally moldable plastic material and one or more layers of a premolded porous material bonded thereto. The plastic material forming the substrate preferably contains a first elastomeric material, a high density mineral filler, a plasticizer and/or a second elastomeric material comprising a natural or synthetic rubber product. The porous material layers may be a porous synthetic foam material layer or a textile fiber layer.

In some embodiments, the porous layer may further include a textile lining, such as a moquette or a loose woven fabric, bonded to an external surface of the porous material.

The soundproofing panels of the present invention are formed by bonding or coupling the heavy plastic substrate layer to the preformed or premolded porous layer. Bonding may be accomplished by sticking the layers to each other, by heating the substrate, or by the use of an adhesive. The composite panel may be molded between two molds to form a panel with a desired shape and/or outline configuration.

The soundproofing panels of the present invention may be used as the separation between an automobile engine compartment and the passenger compartment, as the floor lining of the interior passenger compartment, or as the lower part and sides of the baggage compartment.

The following points are some of the purposes of the present invention and some of the advantages offered thereby.

(1) A decrease in the weight of the soundproofing material as compared to the soundproofing materials that can be currently found on the market. Such materials are normally:

(a) porous textile fibers impregnated with thermosetting resins coupled with layers of bituminous material with heavy fillers (CaCl, BaSO); density of the porous layer: 60-200 Kg/m; density of the bituminous layer: 1500-2000 Kg/mq unitary weight of the porous layer: 1-1.6 Kg/mq; unitary weight of the bituminous layer: 2.5-10 Kg/mq; and (b) polyurethanic foams coupled with rubber like heavy EPDM;

density of the polyurethane: 60-80 Kg/m
density of EPDM: 1500-2000 Kg/m.

The bituminous material and the EPDM are often replaced by heavy PVC (density 1500-2000 Kg/m), while the textile fibers are often replaced by loose woven fabrics.

By using the soundproofing panels of the present invention, a decrease between 12 and 18% can be achieved. This decrease is possible because of the particular type of materials employed.

(2) A decrease in the economic cost of the panels between 5 and 10% (due to the greater incidence of the material on the cost when the weight of the components increases and to the possibility of improving the weight decrease acting on the thickness of the premolded material).

(3) An improvement in the softness/elasticity specification of the premolded material. At the moment, the thickness/density of some premolded materials is partially diminished by the relative stiffness of the heavy materials bonded thereto. The materials employed up to now (generally called septum) may have a high surface weight (>6 Kg/sqm). The specifications of the material of the present invention allow one to limit this decrease. It is believed that the weight reduction with equal acoustic efficiency which can be achieved or the improvement in acoustic efficiency with equal weight which could be obtained is higher than the result of the tests if premolded materials having a higher thickness would be adopted in future car bodies. Positive indications to this regard are the outcome of the laboratory and road tests conducted in connection with the present invention. They allow one to predict that weight reductions up to 18% are possible.

(4) Improved processing of the material may be achieved using conventional panel forming technologies for maintaining a constant thickness such as by means of a mold and a die. The mass of the soundproofing surface can be evenly distributed during forming thanks to the material specifications. It has been found that the thickness variations obtained using the materials described herein are within acceptable 10% tolerances instead of unacceptable 30-40% variations. Still further, a subsequent deadening uniformity takes place on the entire surface of the premolded material.

For the above mentioned purposes and others that will be better appreciated as the description follows, the invention proposes to realize soundproofing panels for applications in the automobile sector. In a preferred embodiment, the panels are characterized by a thermally moldable substrate or agglomerate formed from a first elastomeric material or rubber batch, a plasticizer, a high density mineral filler and/or an additional or second elastomeric material such as polychloroethylene or chlorocaoutchouc. The substrate is bonded to at least one self-supporting premoldable layer of a porous material of the type used to form the lining of an automobile body.

DETAILED DESCRIPTION

Figure 2:
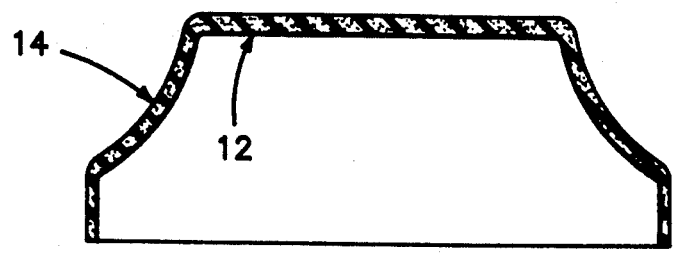
FIG. 2 is a sectional view of the panel of FIG. 1 taken along lines I—I.
Figure 3:
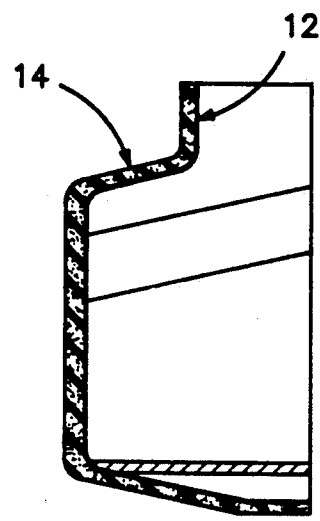
FIG. 3 is a sectional view of the panel of FIG. 1 taken along lines II—II.
Figure 1:
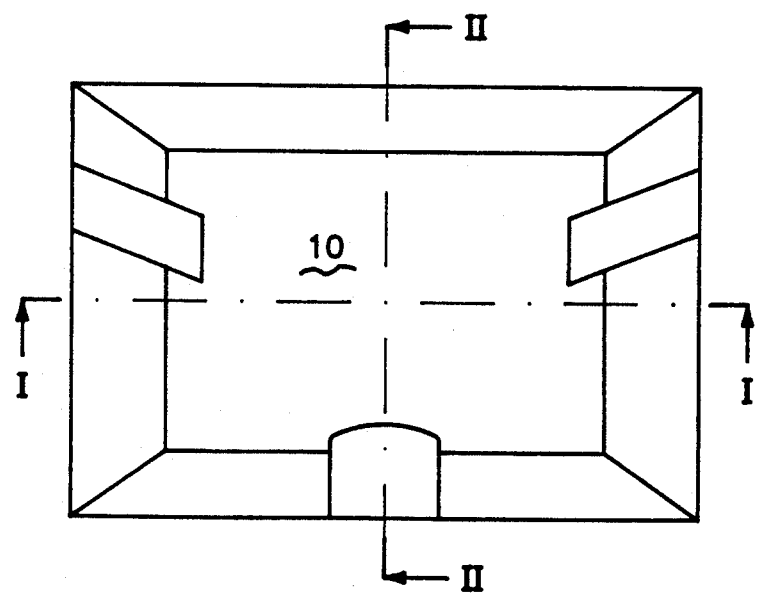
FIG. 1 is a plan view of a soundproofing panel formed in accordance with the present invention.

Referring now to the figures, a soundproofing panel in accordance with the present invention is illustrated in FIGS. 1-3. The panel 10 comprises a laminate construction having a heavy plastic, flexible substrate layer 12 and a porous material layer 14. As will be discussed hereinafter, the panel 10 may be molded into any desired shape and/or configuration.

The heavy plastic substrate layer 12 is preferably formed by a material containing: a first elastomeric or synthetic rubber material selected from the group consisting of styrene butadiene (SBR), isobutylene isoprene (IIR), polyisoprene, ethylene propylene (EPR) and neoprene; a plasticizer e.g. cereclor having a base of naphthenes oil or other commonly used types: a high density mineral filler of the calcium carbonate or barium sulphate types; and a second elastic material formed from a natural chlorinated rubber product such as chlorocaoutchouc or a synthetic rubber product such as polychloroethylene. If desired, lampblack or some other coloring material may be added to give the layer 12 a desired color.

Typical compositions which may be used in accordance with the present invention to form the layer 12 are as follow:

TYPE A

Polyisoprene 15-45% by weight
Plasticizer 1-3% by weight
Polychloroethylene 2-5% by weight
Calcium carbonate 50-80% by weight
Lampblack small percentage 2-3% by weight

TYPE B

Polyisoprene 25-55% by weight
Plasticizer 1-3% by weight
Polychloroethylene 2-5% by weight
Barium Sulphate 40-70% by weight
Lampblack small percentage 2-3% by weight Another type of composition which may be used is the one commonly known as TECSOUND produced by TEXSA S.A. of Barcelona, Spain. Its composition is set out in Spanish Patent No 554,644 and French Patent No. 2,598,150.

The porous material layer 14 may be formed from natural and/or synthetic textile fibers impregnated with thermosetting resins/plastics, synthetic polyurethane and/or polyethylene foams having open or closed cells, or any other suitable porous material. If desired, a textile lining (not shown) such as a moquette or a loose woven fabric may be bonded to an exterior surface of the layer 14.

Figure 6:
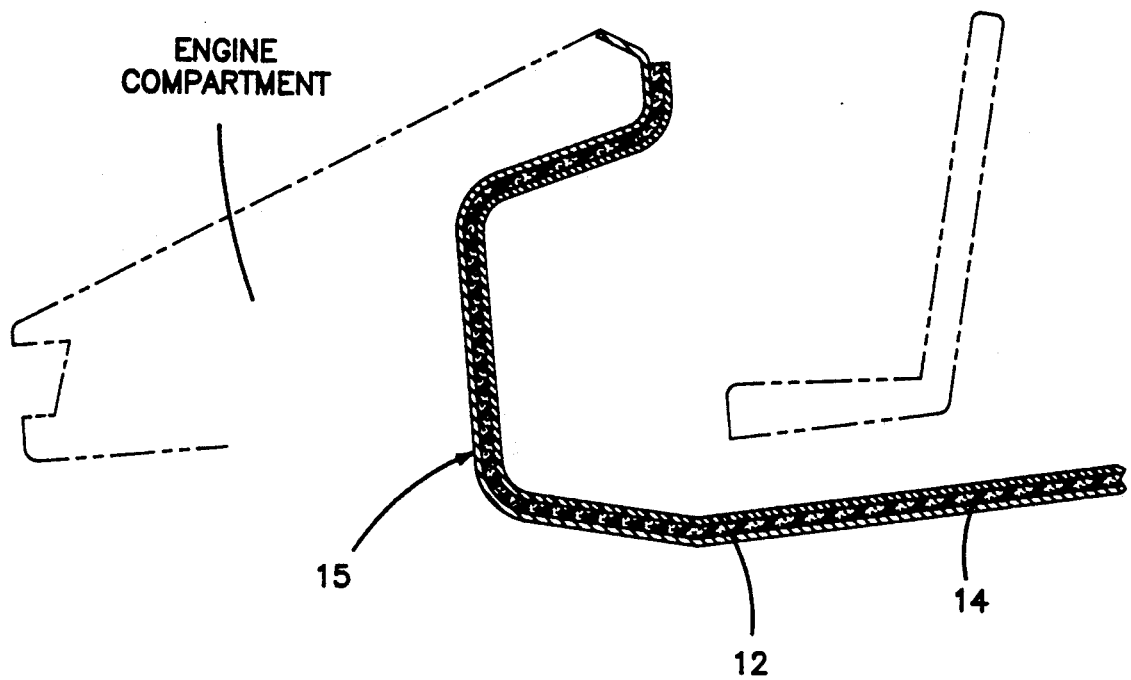
FIGS. 6 and 7 illustrate the use of soundproofing panels in accordance with the present invention in automobile compartments.

The layer 14 may be formed by a premolded, shaped material such as a premolded and shaped carpet. In use, the layer 14 may be laid on a plate 15 of an automobile body to cover visible portions of the automobile. See FIG. 6.

Figure 4:
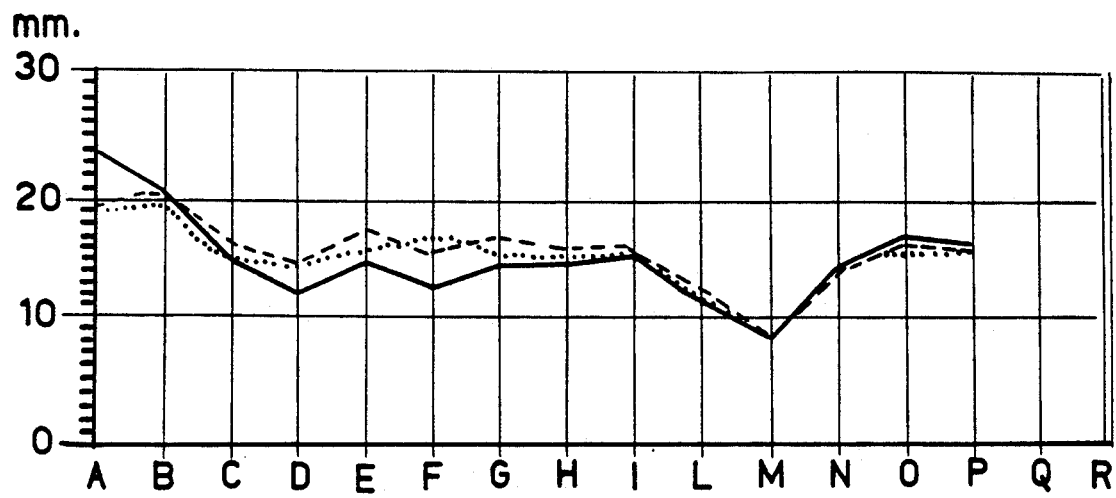
FIGS. 4 and 5 are diagrams illustrating respectively the distribution of the thickness and of the weight of the soundproofing panel on the front part of a car.
Figure 5:
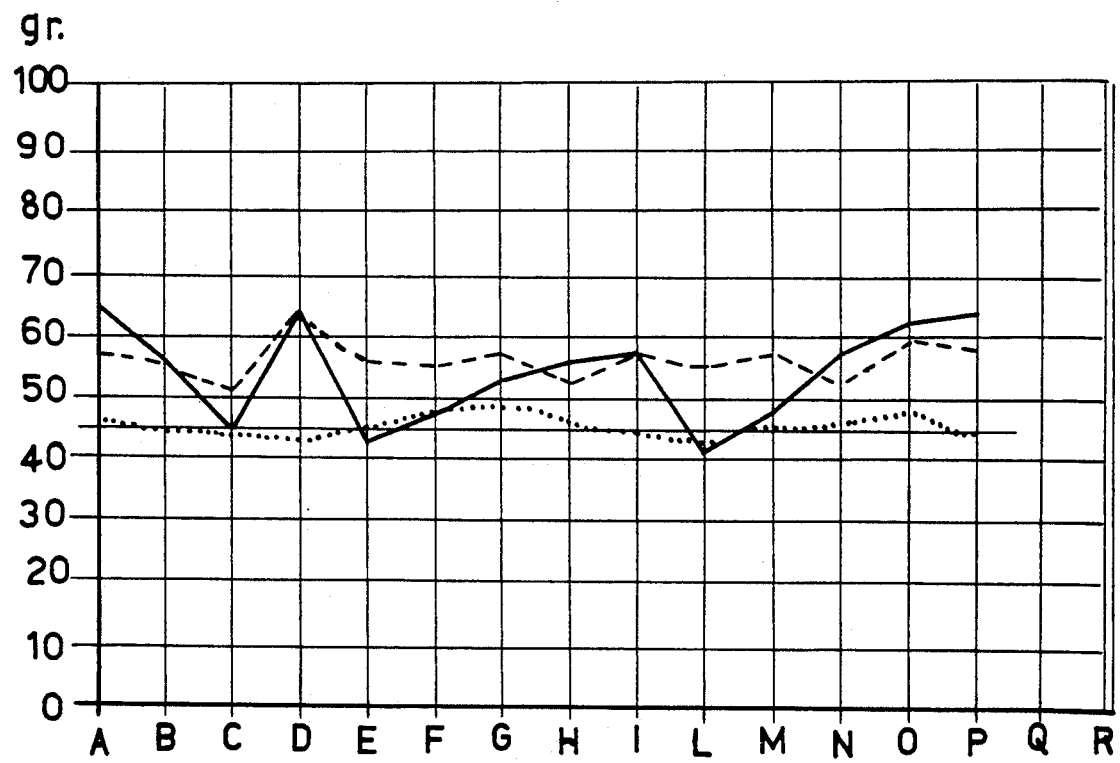

The mechanical specifications of the material forming the layer 12 and the procedure which is the subject of the present invention allow the coupling of the layers using technology characterized by low heat requirement. This characteristic, combined with the high softening limit, reduces the stretching of the material to the minimum and allows a high deep-drawing with constant thickness. This is an important step in the design of soundproofing panels for new car bodies and it is also particularly important for the application of such panels on existing bodies that need prominent drawings. It has been found that substantial improvement may be obtained by employing premolded materials with a greater thickness (due to the decrease of the thrust on the surface of the material and of the subsequent minor mechanical stresses in the critical points). The diagrams shown in FIGS. 4 and 5 respectively summarize the results of research on the distribution of the thickness and the weight of the soundproofing layer of the dashboard of the UNO D/FIRE motorcar. As evidenced by the graphs, the most homogeneous distribution on the premolded soundproofing material which is the subject of the present invention with respect both to the bituminous septum or barrier paired by a mold and a die wherein the premolded porous material is deposited on the mold, the bituminous sheet is deposited over the porous material and the die, descending causes the pairing and to the bituminous septum paired by vacuum aspiration. As used herein, vacuum aspiration refers to a process wherein the premolded porous material is deposited on a holed mold; the bituminous sheet is deposited over the porous material and heated; a vacuum is produced through the holed mold and the porous material whereby the bituminous sheet is paired to the porous material. Points from A to R of the diagrams illustrate the sectionized areas distributed on the surface of a front soundproofing panel. Each point of the sectionized area is a square measuring 100×100 mm. The values indicated in the graph represent the mean measured on various points of the above mentioned square.

The curves represent:

— normally supplied front panel made of vacuum septum—total weight 7,230 gr.

—normally supplied front panel made of constant thickness septum—total weight 7,180 gr.

... front panel made of premolded soundproofing material of the present invention and having a constant thickness —total weight 6,000 gr.

Besides the advantages already mentioned, with respect to other materials, the following are also obtained:

greater stability to temperature (no leakage taking place up to 110° C.);

uniformity of performance at various operating temperatures and at temperature <5° C.;

improvement with aging;

elimination of breaks and/or cracks during operation (also at temperature <5° C.) both due to batch specification and thickness uniformity. Such risk does not exist also in case of a greater thickness and/or greater softness of the premolded material. This is very important especially for the running boards on the floor of the motorcar;

better possibility of combination with other materials in complex multi-layer soundproofing compositions where each layer performs a defined particular function with subsequent exploitation of the obtainable synergisms;

possibility of obtaining gaskets already included in the component.

Figure 7:
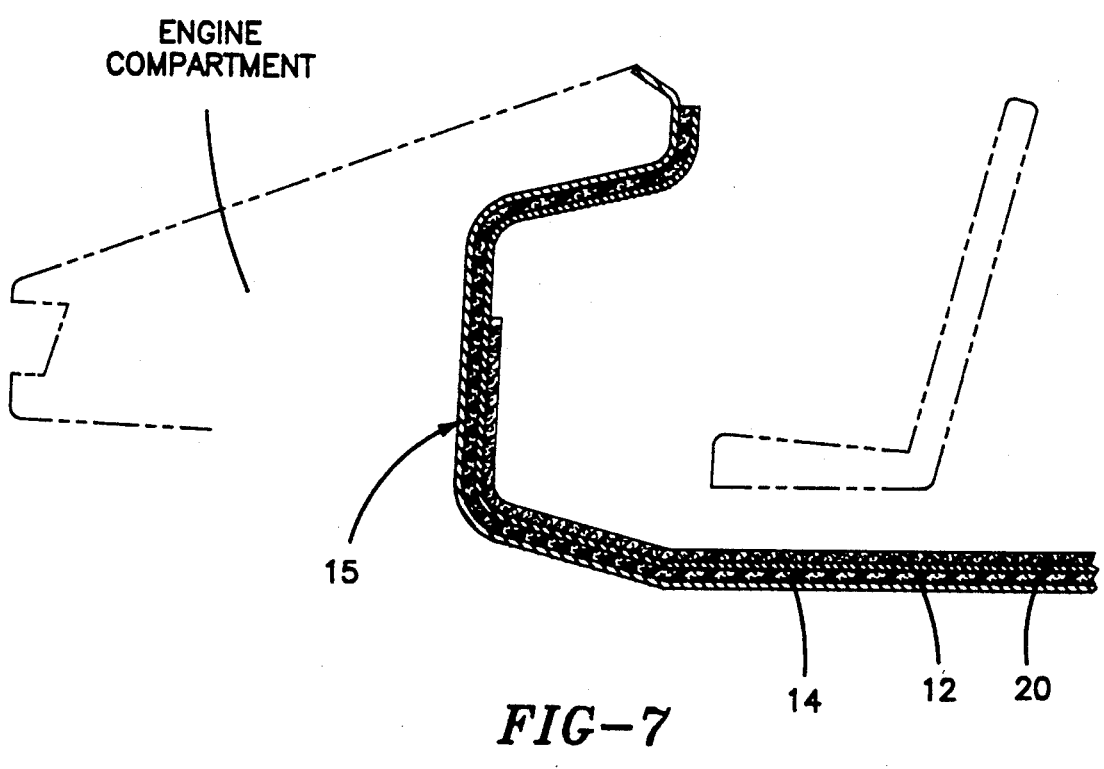

If desired, a soundproofing panel in accordance with the present invention may as shown in FIG. 7 include at least one porous layer 14, at least one heavy plastic layer 12 and a carpet layer 20. The porous layer(s) may be formed from:

natural and/or synthetic textile fibers impregnated with thermosetting resins/plastics; or synthetic polyurethane and/or polyethylene foams having closed or open cells.

The heavy layer(s) may be formed from the elastomer batch compositions described as Types A & B.

The carpet layer may be formed from polyester/polypropylene fibers treated or not treated with binding resins (acrylic type) with/without support of thermally moldable resin (like polyethylene).

The soundproofing panels of the present invention may be formed by heating the material forming the layer to an elastomer softening temperature typically in the range of from about 70° C. to about 180° C. and using a mold to bond the heated material to the premoulded porous sound deadening layer 14. As a result of the molding operation, the layer 12 takes the shape and geometry of the premolded layer 14. If needed, resulting panel construction may be subjected to trimming and hollow punching operations. These operations may be performed using any conventional equipment known in the art.

Some other procedures for obtaining the soundproofing panels of the present invention are now examined.

EXAMPLE No. 1 a) preheating of the heavy plastic layer material at specific station specific for this process;

b) preheating at a further station of a light porous material made of textile fibers impregnated with thermosetting resins;

c) bonding of the heavy plastic layer to the light porous material by means of male and female molds at different temperatures and molding with completion of the baking (polymerization of the thermosetting resins) of the porous layer.

If needed, the resulting panel may be subjected to further operations including outer hollow punching and central piercing at another station and hollow punching of perimeter and of other holes. The foregoing manufacture procedure may be performed by means of material translation automatic systems in an electronically driven plate under a press.

The molds used in this procedure may be made of resin, aluminium, or iron. The molds may contain passages for heat conductor and/or coolant fluids.

Typical operating conditions are as follows:

Pressure: up to 500 tons/sqm.

Molding temperature:
 cold mold max. 60° C. for layer 12
 hot mold max. 220° C.

Preheating:
(a) high frequency preheating:
 6 Mhz–16 Mhz
 power from 14 to 25 KW
(b) or warm air preheating:
 temperature up to 300°–400° C.

The novel aspects of the above mentioned procedure are believed to be:

molding by means of molds at differentiated temperatures mold and setting up of thermostatic control settings;

preheating of the porous layer using warm air/high frequency/waves/IR radiations or combination of same; and obtaining the finished panel with one only stage of machining.

EXAMPLE No. 2 a) preheating of a textile lining made of moquette or of unwoven fabric adequately treated for the premolding to a temperature in the range of 70° C. to 180° C.;

b) preheating of an elastomer batch heavy plastic layer material to a temperature in the range of 70° C. to 180° C.;

c) bonding by means of cold molds at a temperature in the range of 20°–30° C.; and d) if needed, hollow punching of perimeter and of central holes.

EXAMPLE No. 3 a) preheating of textile lining made of moquette or unwoven fabric already paired with a layer of elastomer batch material (soundproofing carpet) to a temperature in the range of 70° C. to 180° C.;

b) preheating of a porous deadening layer made of textile fibers impregnated with thermosetting resins to a temperature in the range of 150° C. to 400° C.;

c) bonding by male and female molds at temperature for the male mold which is at a maximum 60° C. and for the female mold which is at a maximum 220° C. differentiated temperatures and molding with completion of the baking (polymerization of the thermosetting resins) of the porous layer; and d) if needed, outer hollow punching and the central piercing at a proper station and punching of perimeter and of other holes.

EXAMPLE No. 4 a) preheating of the heavy plastic layer material to a temperature in the range of 70° C. to 180° C. on a male mold positioned on a press;

b) transferring premolded porous material onto the preheated batch;

c) cold bonding of the plastic layer to the premolded material, with or without the help of adhesive, by means of the closure of the male mold on a female mold positioned on a plate forming an upper press portion; and d) hollow punching in a following station.

EXAMPLE No. 5 a) transferring the heavy plastic layer material onto the porous premolded material positioned within a container having a desired shape;

b) heating said plastic material and said premolded material with warm air to a temperature in the range of 70° C. to 180° C. and adjusting the plastic layer material to the shape of the premolded material as a result of the applied using heat light pressure exerted by a male dolly and suction through the porous premolded material;

c) definitively adjusting the plastic layer material on the porous premolded material by means of hot air pressure spouts at suitable temperatures up to about 400° C., with or without suction through the porous layer and with or without the intervention of the dolly;

d) cooling by water automization, cold air, or by other cooling vectors; and e) hollow punching.

It is apparent that there has been provided in accordance with this invention soundproofing panels for automobile applications and manufacturing processes therefor which fully satisfy the objects, means, and advantages set forth hereinafter. While the invention has been described in combination with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

What is claimed is:

1. A method for bonding a substrate layer formed from an elastomeric agglomerate batch to a layer of porous material to form a soundproofing panel where the porous material is already premolded characterized by the following operating steps:
   a) preheating the batch on a male mold positioned on a press;
   b) transferring the premolded material onto the preheated batch; and
   c) said transferring step including placing the premolded material into a female mold positioned on a plate of the press and cold bonding said batch to said premolded material with or without the help of an adhesive by means of closure of the male mold on the female mold positioned on the plate of the press.

2. A method for bonding a substrate layer formed from an elastomeric agglomerate batch to a layer of porous material to form a soundproofing panel where the porous material is already premolded, characterized by the following operating steps:
   a) transferring the batch onto the porous premolded material positioned in a suitably shaped container;
   b) preheating said batch by warm air and adjusting the batch to the shape of the premolded material by the exertion of light pressure using a male dolly and by the application of suction through the porous premolded material;
   c) adjusting the batch on the porous premolded material by means of hot air pressure sprouts at a desired temperature with or without suction through the porous layer and with or without the intervention of said dolly;
   d) cooling by at lest one of water automization and application of cold air; and
   e) hollow punching.

3. A method for forming a soundproofing panel having a first layer formed from a batch containing a thermally moldable elastomer agglomerate, a plasticizer and at least one of a high density filler and a further elastomeric material and at least one additional layer formed by a self-supporting material consisting of textile fibers impregnated with thermosetting resins, said method being characterized by the steps of:
   a) preheating the batch at a first station;
   b) preheating said self-supporting material at a second station;
   c) placing said batch in a first mold and said self-supporting material in a second mold at a temperature different than that of said first mold;
   d) baking said self-supporting material while in said second mold to polymerize said thermosetting resins; and
   e) bonding said batch to said self-supporting material.

4. The method of claim 3 further comprising punching at least one hole in said soundproofing panel.

5. A method for forming a soundproofing panel having a first layer formed from an elastomer agglomerate and a second layer formed from a textile covering, said method comprising:
   a) preheating said textile covering layer;
   b) preheating said elastomer agglomerate layer; and
   c) cold mold bonding said textile covering layer to said elastomer agglomerate layer.

* * * * *